United States Patent Office 2,808,178
Patented Oct. 1, 1957

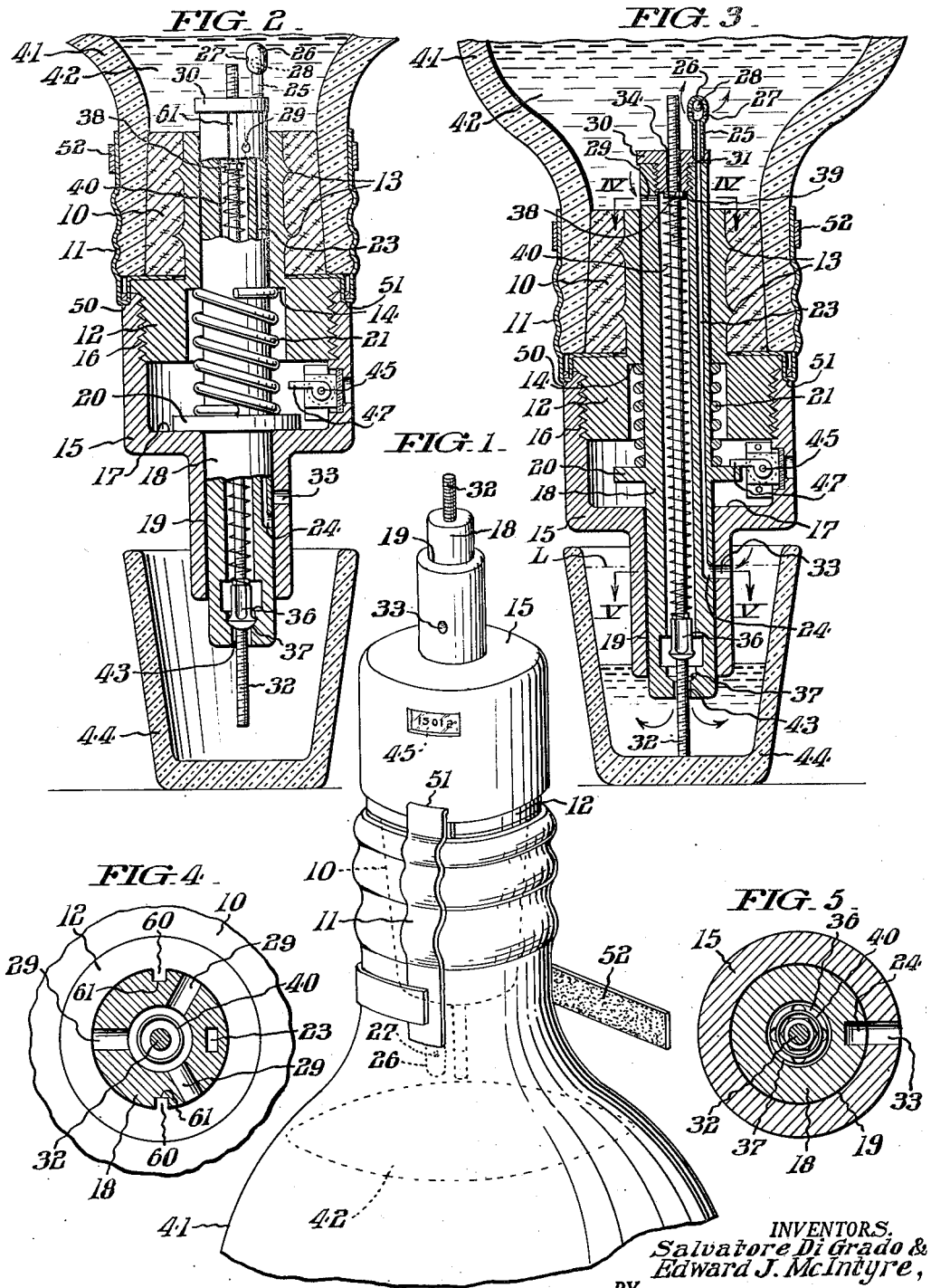

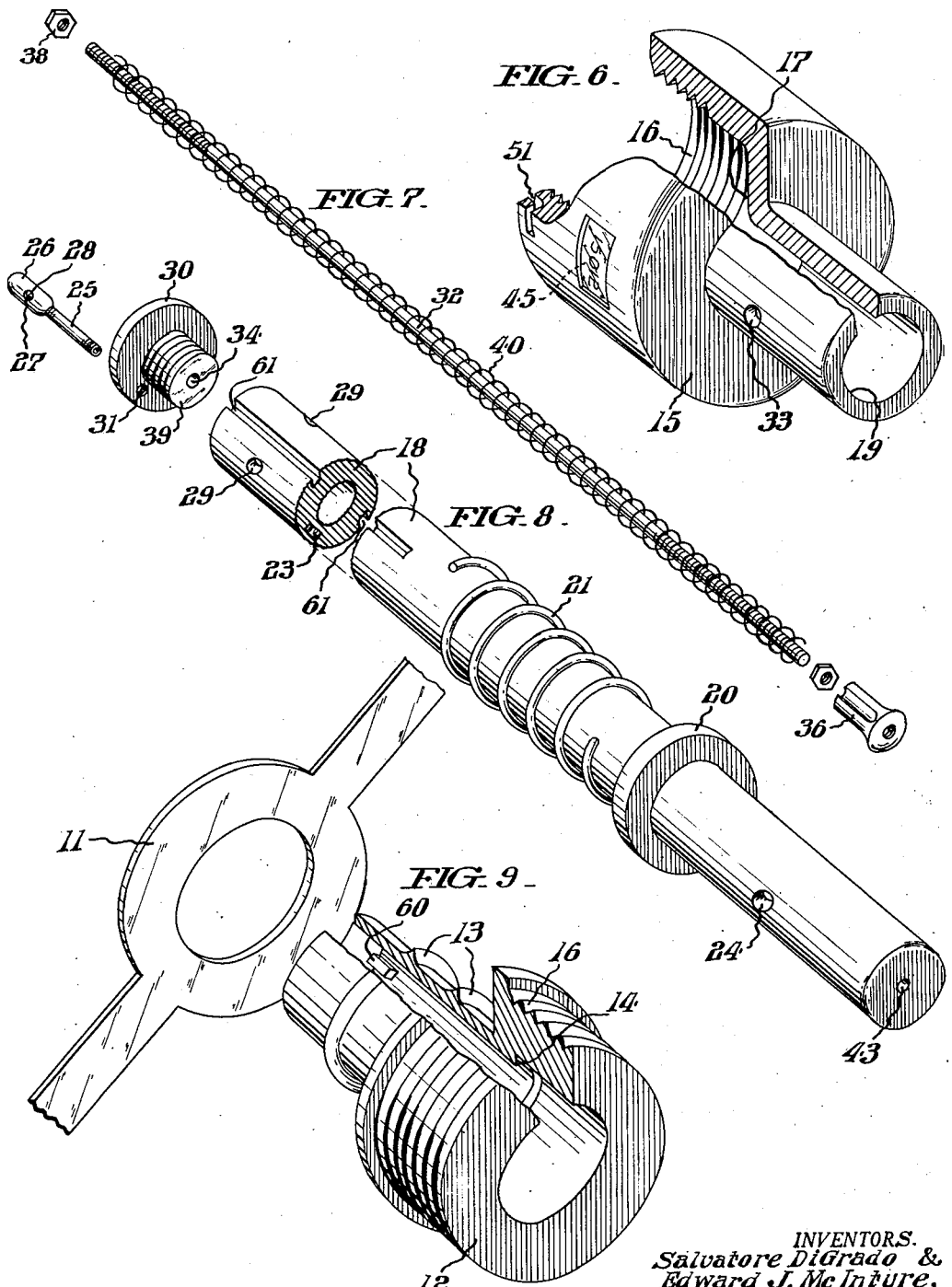

2,808,178

AUTOMATIC REGISTERING POURING DEVICE

Salvatore Di Grado and Edward J. McIntyre, Philadelphia, Pa.; Jean Di Grado, executrix of said Salvatore Di Grado, deceased; assignors to Beverage Control Sales Company of Philadelphia, Inc., Philadelphia, Pa., a corporation of Pennsylvania Application February 5, 1954, Serial No. 408,346

21 Claims. (Cl. 222—38)

The invention relates to a pouring device of the type used in taverns and taprooms, to be attached to the opening of various types and sizes of beverage containing bottles. It has long been a problem to tavern and taproom owners to maintain a continuing and accurate check on the quantity of various types of beverages sold by the drink. Many devices have been made which limit the amount of fluid that may be dispensed at any one pouring or which register the number of drinks poured. However, none of these devices provided a positive accurate check on the quantity of fluid and the number of drinks dispensed.

It is the primary object of this invention to provide a drink pouring device which can be affixed to the opening of any of the containers normally used in the tavern or taproom business which will provide an accurate and certain check upon the amount of fluid dispensed from any given container, and a concurrent registration of the number of drink units dispensed, the device being affixed to the container in such a manner that it may not be removed without the knowledge of the tavern or taproom owner.

It is a further object of this invention to provide an automatic measuring pouring device having an internally contained counting unit which registers each time a drink unit is dispensed from the container.

It is another object of this invention to provide an automatic measuring pouring device which permits the dispensation of a fixed amount of fluid each time a drink unit is poured.

It is a still further object of this invention to provide an automatic measuring pouring device which may be easily and economically fixed to the opening of a container in such a manner that it cannot be removed and replaced secretly.

It is another object of this invention to provide a device which registers the number of drinks poured from a container, which is contained internally of a unitary pouring device.

Many other objects and advantages of the invention will be apparent from the following description, and will be seen in the drawings of which:

Fig. 1 is a perspective view of the drink pouring device inserted in the neck of a bottle, showing the counting mechanism and the yoke seal attachment;

Fig. 2 is a longitudinal partial sectional view of Fig. 1, showing the fluid transmission mechanism extended;

Fig. 3 is the same as Fig. 2 except that the fluid transmission means is depressed to permit the flow of fluid and the fluid transmission mechanism is fully sectioned;

Fig. 4 is a view through the section IV—IV of Fig. 3;

Fig. 5 is a view through the section V—V of Fig. 3;

Fig. 6 is a partially cut away perspective view of the upper cap element shown in Fig. 1;

Fig. 7 is a perspective view of the solid rod inserted through the fluid transmission tube of Fig. 8;

Fig. 8 is a perspective view of the fluid transmission tube;

Fig. 9 is a perspective view of the lower cap element and the attachment yoke according to the invention.

Throughout, the respective positions of the various elements of the invention will be based upon the position in Fig. 1. Thus the "upper" cap element is the one shown to be uppermost in Fig. 1, and the fluid will flow from the bottom to the top elements. It is noted, however, that in actual normal operation of gravity flow the pouring device will be inverted as shown in Figs. 2 and 3.

The drink pouring device which is the subject of this invention comprises the following elements which are shown in the drawings: a solid rod 32, having fluted valve means 36 near its upper end and a nut 38 attached by threads near the lower end with a spiral compression spring 40 surrounding the rod 32 between the valve 36 and nut 38, as shown in Fig. 7; a hollow tube 18 having openings 43 and 34 at either end with a channel 23 recessed in one side wall of the tube opening to the outside of the rod at its upper end at 24 and extending into an enclosure element 30 below the bottom thereof and having further openings 29, from the interior to the outside at the lower end with a coil spring 21 surrounding the tube along its length as shown in Fig. 8; an upper cap element 15 which is hollow and threaded internally as at 16 at its lower end and having a counting mechanism 45 inserted therein as shown in Fig. 6; and a lower cap element 12 having an internal bore and being threaded as at 16 at its upper end externally and having corrugations 13 on its lower outside surface to hold a cork 10, as shown in Fig. 9.

The assembled pouring device as shown in Figs. 1, 2 and 3 is affixed to the neck of the bottle 41 by means of the cork 10 and the metallic yoke 11. Into the cork 10 is inserted the lower cap element 12 which is held in place by means of the corrugations 13. The lower cap 12 is hollowed out cylindrically and the hollow portion is widened near the upper end to provide the shoulder 14. The upper cap element 15 is attached to the lower cap element 12 by means of the threads 16. The upper cap element 15 is co-axially hollow with respect to the lower cap element 12, and at its lower end is recessed to provide the shoulder 17. Through the cylindrical opening of the upper and lower cap elements 12 and 15, is passed the hollow tube 18 which is designed to fit snugly against the walls 19 of cap element 12 as shown. The tube 18 is keyed to the lower cap element 12 by the keys 60 of cap element 12 and the recessed grooves 61 in the tube 18. This prevents the tube 18 from rotating laterally within the wall 19. A flange 20 is integrally attached to the hollow rod 18 against which the coil spring 21 abuts. The other end of the coil spring 21 rests against the shoulder 14. In the side wall of the hollow tube 18 is formed a recessed channel 23 which extends from the opening 24 at the outside to the lower end of the rod 18 where it joins the extended hollow tube 25 which is equipped with a bell-like covering 26 having an opening 27 in one side and having a small pellet 28 inserted therein. Other openings from the interior of the hollow tube 18 to the outside are provided at 29. Into the lower end of the hollow tube 18 is inserted the threaded tube cap 30. Cap 30 is hollowed internally and is provided with an opening 31 to connect the recessed channel 23 with the hollow tube 25. Throughout the length of the hollow tube 18 is disposed the solid rod 32 which extends through the opening 43 in the upper end of the hollow tube 18 and the opening 34 in the threaded cap 30 at the lower end of the hollow tube 18. At the upper end of the solid rod 32 is affixed the fluted valve 36 which abuts against the shoulder 37 at the end of the hollow tube 18. The tube 18 is enlarged above the shoulder 37 to provide free space for fluid flow when valve 36 is lowered. At the lower end of the solid rod 32 is affixed the nut 38 which abuts against the shoulder 39 created by the threaded cap 30. Between the bottom of the valve 36 and the threaded cap 30 is the coil spring 40.

As shown in Fig. 2, when the bottle 41 which contains the fluid 42 is inverted, no fluid can be expelled since no air can be admitted from the outside through the hollow tube 18 and the opening 43 to the outside is covered by the valve 36. In Fig. 3, the pouring device is shown in operation. The container 41 is lowered to the bottom of the receptacle 44 into which the fluid 42 is to be poured, so that the rod 32 is forced up into the hollow tube 18. The movement of the solid rod 32 is limited by the position of the nut 38 on the solid rod 32 which abuts against the shoulder 39. When this point is reached, the hollow rod 18 is then forced back along the hollow interior of the lower and upper cap elements 12 and 15 until the opening 33 in the side wall of the upper cap element 15 is aligned with the opening 24 of the recessed channel 23 which extends through the hollow rod 18. As the hollow rod 18 is forced back, the opening 29 through its side wall extends up into the body of the fluid 42 in the container 41 allowing it to flow into the hollow rod 18. It will be observed, however, that no fluid will be permitted to flow unless air is otherwise permitted to enter the container 41 due to the partial vacuum created in the area above the fluid 42 in the container 41 and the viscosity of the fluid itself. However, air is permitted to enter the container by means of the recessed channel 23. Thus, when the hollow rod 18 is sufficiently depressed to align the opening 33 and the opening 24 of the recessed channel 23 and to bring the opening 29 into the body of the fluid, the fluid will be permited to flow down through the hollow rod 18 through the opening 43 into the receptacle 44. The fluid 42 will flow until it reaches a level L in the receptacle 44 which covers the opening 33 in the side of the upper cap element 15. At that point, no air will be permitted to enter the container 41 and no more fluid will flow.

It will be noted that the size of the drink poured may be regulated by the length of the rod 32 which extends beyond the upper end of tube 18, since this length determines the distance of the opening 33 from the bottom of the receptacle 44. The liquid will rise to the opening 33. Adjustment of the rod 32 may easily be made by changing the positions of the fluted valve 36 and nut 38 on the rod 32. It is important, however, that the distance between the valve 36 and the nut 38 be maintained constant to conform to the length of tube 18 and to permit valve 36 to cover opening 43 when rod 32 is extended by the spring 40.

Also positioned within the upper cap element 15 is the counting mechanism 45 which is fixed to be operated by the flange 20 by depressing the counter arm 47. The flange 20 and the counter arm 47 are so positioned that the opening 33 and the opening 24 of the recessed channel 23 will not be brought into alignment unless the counting mechanism 45 has been actuated. With this arrangement, it will be absolutely necessary to trip the counting mechanism 45 and thus register the pouring of a drink in order to remove any fluid 42 from the container 41.

After the level L in the receptacle 44 has been reached which prevents further flow of fluid, when the container 41 is raised, the coil spring 21 forces the hollow rod 18, by means of the flange 20, to extend upwardly, thus bringing the opening 33 out of alignment with the recessed channel 23. At the same time, the coil spring 40 forces the solid rod 32 to extend upwardly within the hollow tube 18 placing the valve 36 against the opening 37 at the end of the hollow tube 18. When the flow of air through the recessed channel ceases, the ball 28 drops within the extended rod 25 covering the opening 27 thus preventing the escape of any fluid through the recessed channel 23.

From the above, it will be seen that by means of this invention it will be impossible to remove fluid from a container to which the pouring device is attached without registering the counting mechanism 45. This enables the taproom owner to ascertain within reasonable limits the expected ratio of quantity of drinks dispensed to number of drinks dispensed. By employing a receptacle of fixed dimensions, the taproom owner may determine absolutely the number of drinks which should be obtained from any bottle of standard size. Should the registered number of drinks be less than this number, he will know that the bottle has been emptied by means other than those authorized. It is, of course, imperative that the pouring device be sealed to the top of the container to prevent dilution of the contents. This may be assured by means of the yoke 11 which is disposed between the cork 10 and the body of the lower cap element 12 and extended through apertures 50 and 51 on either side of the upper cap element 15 and sealed to the side of the neck of the container 41 by means of the sealed strap 52.

A pouring device made according to the invention may be applied to any kind, shape or size of bottle having a neck in which a stopper may be inserted. Furthermore the device may be made of any material or materials having the desired physical properties depending upon the type of fluid to be dispensed. It is to be understood that the embodiment of this invention shown and described herein is to be taken as a preferred example of the same and that various alterations may be made without departing from the spirit of the invention or the scope of the claims.

It will be noted that equivalent means may be employed for various elements of the invention. Thus the threads 16 which connect the upper and lower cap elements, 15 and 12, may be replaced by a smooth-surfaced press fit. The same is true of the threaded cap element 30. Also the lever connection 47 between the counting mechanism 45 and the flange 20 may be replaced by a direct ratchet and pinion arrangement. All such equivalents may be applied within the spirit of the invention.

Having thus described the invention, we claim:

1. A device for metering the flow of liquid from a container comprising a housing, drink counting means, means for actuating said counting means, means for admitting air into said container upon actuation of said counting means by said counter actuating means, and a slidable hollow tube mounted in said housing and in slidable contact therewith extended into said container having an opening through the wall thereof near the end in said container and means for passing fluid from said container to said hollow tube upon actuation of said counting means by said counter actuating means.

2. A device for metering the flow of fluid from a container comprising counting means and a hollow tubular stopper insertable in the neck of said container, a lower cap element inserted in said stopper, an upper cap element threadably attached to said lower cap element, said upper cap element having an opening in the side near the upper end thereof, said cap elements being substantially hollow and adapted to receive a cylindrical tube, a hollow cylindrical tube slidably disposed through said cap elements extending at one end into said container and at the other end into the air free of said cap element, said tube having an enclosed channel through the side thereof having a first valved opening into said container and a second opening near the opposite end of said tube and flange means, said flange means adapted to actuate said counting means when the opening in the upper cap element is in line with the said second opening in said tube.

3. A fluid metering device comprising a housing, an expanded portion in said housing intermediate the ends thereof, means in said expanded portion integral with said housing for mounting a counter, a counter mounted in said expanded portion, fluid transmission means slidably mounted in said housing and in sliding contact therewith on either side of said expanded portion, means for passing said fluid through said fluid transmission means when the transmission means is in a predetermined position relative to said counter and said housing and means for actuating said container when the transmission means is in said predetermined position.

4. A fluid metering device comprising a housing, an expanded portion in said housing, means in said expanded portion for mounting counting means, counting means integral with said housing mounted in said expanded portion, fluid transmission means slidably mounted in said housing and in sliding circumferential contact therewith and counter actuating means integral with said fluid transmission means for actuating said counting means when the transmission means is in a predetermined position relative to said housing.

5. A fluid metering device comprising a housing, an expanded portion in said housing, means in said expanded portion for mounting a counter, a counter mounted in and enclosed by said expanded portion, substantially solid-walled fluid transmission means extending through said expanded portion, means for admitting air to said fluid, means for passing said fluid through said fluid transmission means when air is admitted to said fluid and means for actuating said counter when air is admitted to said fluid.

6. A device for metering the flow of fluid from a container comprising stopper means inserted in the neck of said container, a housing fitted in said stopper means and extending above the neck of said container, fluid transmission means disposed within said housing and extending at one end thereof into said container, counting means, means for admitting air to said container, means for passing fluid into said fluid transmission means from said container upon the admission of air thereto and means for actuating said counting means upon the admission of air to said container.

7. A device for metering the flow of fluid from a container comprising a housing affixed to the neck of said container, a substantially hollow tube slidably mounted in said housing and in sliding contact therewith, longitudinally spaced air vent openings through the wall of said tube, an enclosed air vent channel in communication with said openings, means integral with said housing for covering one of said openings when said tube is in a predetermined position relative to said container, a valved tube-actuating rod slidably mounted in said tube and means integral with said rod for urging said tube toward said container in response to the movement of said rod to uncover said one opening.

8. In a device for metering the flow of fluid from a container, a counter, a hollow tube adjacent said counter having openings at each end for passing fluid through said tube, means for mounting said tube slidably with respect to the container, air vent openings in said tube near each end thereof, an enclosed air vent channel connecting said air vent openings, means for moving one end of said tube into said container to admit air thereto through said air vent openings and to pass fluid thereupon through said fluid openings and means for actuating said counter when said tube is moved into said container.

9. A device for metering the flow of liquid from a closed container comprising a housing, tubular liquid transmission means mounted in said housing and axially slidable therein and in slidable contact therewith, drink unit counting means mounted in said housing, means for actuating said counting means concurrently with the flow of fluid from said container and means for preventing the flow of fluid from said container except upon actuation of said counting means.

10. A device for metering the flow of liquid from a container comprising a housing, non-rotating liquid transmission means slidably mounted in said housing and in slidable contact therewith, drink counting means enclosed in said housing, means for actuating said counting means, yieldable means urging said liquid transmission means away from said container, a separate continuous passage through said housing and into said container for admitting air to said container from outside said housing to permit the flow of liquid through said transmission means and means for opening said air passage upon actuation of said counting means.

11. In a device for metering the amount of liquid poured from a bottle, a two-part housing, the lower part of which is insertable in the neck of said bottle, a yoke inserted between the upper part of said housing and the neck of said bottle, said yoke having tabs extending through openings in the upper part of said housing and adapted to lie along the outside of the neck of said bottle and means for encompassing said tabs to fasten them to the neck of said bottle.

12. A device for metering the flow of fluid from a container comprising stopper means inserted in the neck of the container, a housing inserted in said stopper means and extending above said container, an expanded portion in said housing intermediate the ends thereof, means in said expanded portion for mounting a counter, a counter in said expanded portion, tubular fluid transmission means slidably mounted in said housing and in sliding contact therewith on either side of said expanded portion, means for passing fluid to said transmission means from said container upon admission of air thereto, counter actuating means in said expanded portion integral with said fluid transmission means and means integral with said fluid transmission means for admitting air to said container upon actuation of said counter.

13. A device for metering the flow of fluid from a container comprising a housing inserted in the neck of said container, an expanded portion in said housing intermediate the ends thereof, aligned tubular channel portions in said housing adjacent said expanded portion, a hollow tube slidably mounted in said housing and in slidable contact with said channel portions, an enclosed passage integral with said tube and extended longitudinally along the wall thereof, a counter in said expanded portion and visible from outside said housing, flange means on said tube for actuation of said counter, yieldable means in said housing for urging said tube away from said container to close said tube and passage from communication with said fluid, and means in said housing for limiting the movement of said tube away from said container.

14. A device for metering the flow of liquid from a container comprising stopper means removably attached to the neck of said container, housing means removably attached to said stopper, an expanded portion in said housing means, air admission means slidably mounted in said housing and in sliding contact therewith, fluid transmission means slidably mounted in said housing and in sliding contact therewith and counting means mounted in said expanded portion, said fluid transmission means being adapted to prevent the flow of fluid from the container and said device unless air is concurrently admitted to the container through said air admission means, means integral with said housing for closing said air admission means except upon actuation of said counting means and means in said expanded portion for actuating said counter upon opening of said air admission means.

15. The device of claim 14 further characterized by the fact that said housing means comprises upper and lower cap elements separably connected and having axially aligned cylindrical channels disposed through their lengths.

16. The device of claim 14 further characterized by the fact that said air admission means comprises an opening in the upper portion of said housing, a covered passage adjoining said opening when said counting means is actuated, and a covered tube extending into the said liquid having openings and a small pellet inserted therein.

17. The device of claim 14 further characterized by the fact that said counting means comprises a number registering mechanism having a rotatable arm, adapted to register upon movement of said arm.

18. The device of claim 14 further characterized by the fact that said fluid transmission means comprises a substantially hollow flanged tube slidably inserted in said housing, said flange being disposed in said housing to actuate said counting means, said tube being held in position to prevent the flow of liquid from said container by detent means.

19. The device of claim 14 further characterized by the fact that said fluid transmission means includes a rod extended throughout said means, said rod having a valve at one end disposed to prevent the flow of liquid through said means and having a coiled spring disposed to maintain said valve in a closed position.

20. The device of claim 14 further characterized by the fact that said device is adapted to stop the flow of liquid therethrough when the liquid is poured into a receptacle, upon the level of liquid in the receptacle reaching the level of said air admission means.

21. A device for metering the flow of fluid comprising a housing forming an interior longitudinal channel, said channel being interrupted intermediate the ends thereof to form an opening in said housing, a tube slidably mounted in said channel and in sliding circumferential contact therewith, a counter disposed in said opening and counter actuating means operatively connecting said tube and said counter in said opening adapted to actuate said counter when said tube is moved with respect to said housing.

References Cited in the file of this patent

UNITED STATES PATENTS

| | | |
|---|---|---|
| 845,531 | Davison | Feb. 26, 1907 |
| 1,165,711 | Ransom | Dec. 28, 1915 |
| 1,929,564 | Rolph | Oct. 10, 1933 |
| 2,206,053 | Schroeder | July 2, 1940 |
| 2,455,962 | Wheeler et al. | Dec. 14, 1948 |
| 2,469,746 | Sanchis | May 10, 1948 |
| 2,473,462 | Wortman | June 14, 1949 |
| 2,566,669 | Lesnick | Sept. 4, 1951 |
| 2,580,292 | Geary et al. | Dec. 25, 1951 |
| 2,631,755 | Woodward | Mar. 13, 1953 |